Figure 1:
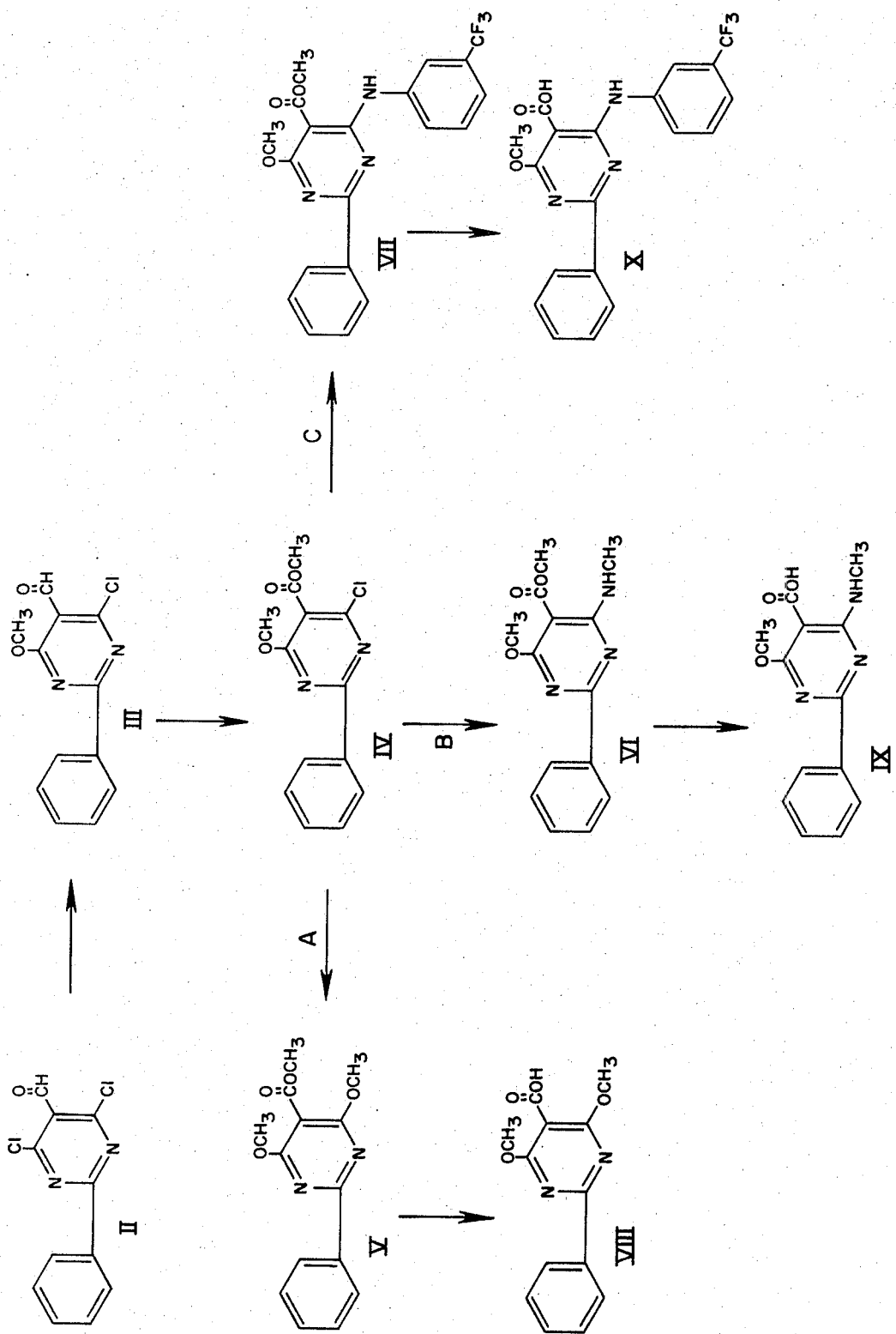

United States Patent [19]
Kim et al.

[11] 3,862,948
[45] Jan. 28, 1975

[54] 4-SUBSTITUTED -6-METHOXY-2-PHENYL-5-PYRIMIDINE CARBOXYLIC ACIDS

[75] Inventors: Dong H. Kim, Wayne; Arthur A. Santilli, Havertown, both of Pa.

[73] Assignee: American Home Products Corporation, New York, N.Y.

[22] Filed: Oct. 30, 1972

[21] Appl. No.: 302,306

[52] U.S. Cl........ 260/256.4 C, 260/251 R, 424/251
[51] Int. Cl............................................. C07d 51/42
[58] Field of Search... 260/256.4 N, 256.4 C, 251 R

[56] References Cited
UNITED STATES PATENTS
| | | | |
|---|---|---|---|
| 3,517,011 | 6/1970 | Kim et al. | 260/256.4 N |
| 3,563,984 | 2/1971 | Kim et al. | 260/256.4 N |
| 3,631,044 | 12/1971 | Kim et al. | 260/256.4 F |

OTHER PUBLICATIONS
J. Chem. Soc. (1965), 5467–5473, Caton et al.

Primary Examiner—Henry R. Jiles
Assistant Examiner—S. D. Winters
Attorney, Agent, or Firm—David E. Frankhouser

[57] ABSTRACT

Compounds of the formula

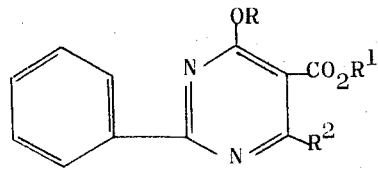

wherein R is lower alkyl; $R^1$ is hydrogen or lower alkyl; and $R^2$ is chloro, bromo, iodo, methoxy, or N-methylamino, or an anilino group substituted in the phenyl moiety thereof with one or two hydrogen, lower alkyl, or trifluoromethyl groups; show CNS depressant activity.

7 Claims, 1 Drawing Figure

4-SUBSTITUTED-6-METHOXY-2-PHENYL-5-PYRIMIDINE CARBOXYLIC ACIDS

This invention relates to new and pharmacologically active 4-(substituted)-6-methoxy-2-phenyl-5-pyrimidinecarboxylic acids and the lower alkyl esters thereof.

2-Phenyl-4-(α, α, α-trifluoro-m-toluidino)-5-pyrimidinecarboxylic acid and the ethyl ester thereof are described by P. Juby and T. Hudyma, *J. Med. Chem.*, 10, 954 (1967).

The invention sought to be patented comprises chemical compounds of the structural formula:

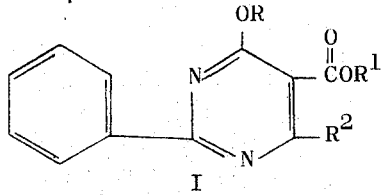

I wherein R is lower alkyl; R¹ is hydrogen or lower alkyl; and R² is chloro, bromo, iodo, methoxy, methylamino, or an anilino group substituted in the phenyl moiety thereof with one or two hydrogen, lower alkyl, or trifluoromethyl groups.

The compounds of Formula I exert a depressant action on the central nervous system as demonstrated by evaluation in standard pharmacological test procedures.

FIG. I of the accompanying Drawing illustrates schematically the reaction sequence for preparing the 4-substituted-6-alkoxy-2-phenyl-5-pyrimidinecarboxylic acids, specifically 4-chloro-6-methoxy-2-phenyl-5-pyrimidinecarboxylic acid, methyl esters, 4,6-dimethoxy-2-phenyl-5-pyrimidinecarboxylic acid, 6-methoxy-2-phenyl-4-(α, α, α-trifluoro-m-toluidino)-5-pyrimidinecarboxylic acid, and 4-methylamino-6-methoxy-2-phenyl-5-pyrimidinecarboxylic acid.

Referring now to FIG. I wherein the compounds are assigned Roman numbers for identification, a 4,6-dihalo-5-formyl-2-phenylpyrimidine (II) is treated with a lower alkanol in the presence of a base, for instance triethylamine or a sodium (lower) alkoxide to afford a 4-halo-5-formyl-6-(lower)-alkoxy-2-phenyl-pyrimidine (III). Oxidation of the formyl group of Compound III using the method of E. J. Corey, et al., *J. Am. Chem. Soc.*, 90, 5616 (1968), i.e. with manganese dioxide in a lower alkanol in the presence of sodium cyanide, yields a mixture of 5-pyrimidinecarboxylic acid esters, namely a 4-halo-6-(lower)alkoxy-2-phenyl-5-pyrimidinecarboxylic acid (lower)alkyl ester (IV) and a 4,6-di(lower)alkoxy-2-phenyl-5-pyrimidinecarboxylic acid (lower) alkyl ester (V). Replacement of the 4-halo group of Compound IV (Reactions A, B, and C) yields, respectively, the 4-lower alkoxy compound (V), the 4-(N-methylamino) Compound (VI), or the 4-anilino Compound (VII). Reaction A is effected by reacting Compound IV with the sodium or potassium salt of a lower alkanol dissolved in an appropriate lower alkanol. Reaction B is effected by reacting Compound IV with methylamine in a steel bomb at about 100°C. Reaction C is effected by reacting Compound IV with an anilino compound (or a substituted anilino compound) in dimethylformamide. If desired, the esters V, VI, or VII can be hydrolyzed to give the corresponding free acids (VIII, IX, or X) using conventional hydrolysis procedures, such as with aqueous sodium hydroxide, followed by acidification.

As used herein and in the claims, the terms "lower alkyl," "lower alkanol," and "lower alkoxy" contemplate such groups in which the alkyl moiety thereof is a methyl, ethyl, propyl, or isopropyl group. The term "halo" contemplates the chloro, bromo, or iodo atoms.

The starting materials employed in the aforedescribed processes are either known compounds or can be prepared from known compounds by conventional methods.

When the compounds of the invention are employed as depressants of the central nervous system, they may be administered alone or in combination with pharmaceutically acceptable carriers, the proportion of which is determined by the solubility and chemical nature of the compound, chosen route of administration, and standard pharmaceutical practice. For example, they may be administered orally in the form of tablets or capsules containing such excipients as starch, lactose, magnesium stearate, and so forth. They may be administered orally in the form of solutions or they may be injected parenterally, e.g. intramuscularly. For parenteral administration, they may be used in the form of a sterile solution or suspensions containing other solutes, for example, enough saline or glucose to make the solution isotonic.

The dosage of the present pharmacologically active agents will vary with the form of administration and the particular compound chosen. Futhermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a dosage level that will generally afford effective results without causing any harmful or deleterious side effects.

The manner and process of making and using the invention are illustrated in the following examples:

EXAMPLE I

4-Chloro-5-Formyl-6-Methoxy-2-Phenylpyrimidine

A. A mixture of 4,6-dichloro-5-formyl-2-phenylpyrimidine (14.23 g.), triethylamine (5.7 g.) and 150 ml. of methanol is heated under reflux for 4.5 hours. The reaction mixture is chilled causing separation of a precipitate which is collected, washed with water and then methanol to give 8.0 g. of the title compound, m.p. 139°–141°C. Concentration of the filtrate and subsequent chilling affords an additional 1.25 g. of the product. Recrystallization from ether provides a sample, m.p. 143°–145°C.

Analysis for $C_{12}H_9ClN_2O_2$:

Calculated: C, 58.19; H, 3.66; N, 11.31.

Found: C, 57.96; H, 3.60; N, 11.28.

B. To a hot mixture of 4,6-dichloro-5-formyl-2-phenylpyrimidine (10 g.) and 100 ml. of methanol is added dropwise a methanol solution containing sodium methoxide which is prepared by dissolving 0.9 g. of sodium in 20 ml. of methanol. The resulting mixture is heated under reflux for ca. 5 minutes and then chilled in ice causing a precipitate to separate (4.0 g.). This product is separated into two fractions by recrystallization from ether. The ether soluble fraction (m.p. 141°–143°C) is 4-chloro-5-formyl-6-methoxy-2-phenylpyrimidine.

The ether insoluble fraction is dissolved in 60 ml. of hot water with addition of a few drops of 15% aqueous sodium hydroxide solution and the solution is filtered. Acidification of the filtrate with dilute hydrochloric acid causes separation of a precipitate which is collected and washed with water. This compound is 4-chloro-5-formyl-6-hydroxy-2-phenylpyrimidine, m.p. 253°–254°C dec.

Analysis for $C_{11}H_7ClN_2O_2$:
Calculated: C, 56.31; H, 3.01; N, 11.94.
Found: C, 56.54; H, 3.17; N, 12.09.

EXAMPLE II

Oxidation of 4-Chloro-5-Formyl-6-Methoxy-2-Phenylpyrimidine

To a mixture of 4-chloro-5-formyl-6-methoxy-2-phenylpyrimidine (7.5 g.) and methanol (150 ml.) is added sodium cyanide (7.8 g.). The resulting mixture is stirred for 15 minutes. Glacial acetic acid (3 ml.) and active manganese dioxide (55.5 g.) is added and the reaction mixture is stirred at room temperature for 22 hours. The inorganic salts are removed by filtration and washed with methanol 5 times. Evaporation of methanol from the filtrate and washings under reduced pressure affords a solid residue which is extracted with about 120 ml. of ether and 50 ml. of water. The ether extract is washed with water several times and dried over calcium chloride. Removal of ether under reduced pressure gives a light amber oil (7.7 g.). This oil is extracted with warm petroleum ether (3 × 300 ml.). Chilling of the extract in ice causes separation of an oily layer. The supernant liquid is collected and evaporated under reduced pressure to give a white solid, m.p. 83°–86°C. After repeated recrystallization from petroleum ether with charcoal treatment the melting point is 87°–88°C. This material is an equal-molar mixture of 4-chloro-6-methoxy-2-phenyl-5-pyrimidinecarboxylic acid methyl ester and 4,6-dimethoxy-2-phenyl-5-pyrimidinecarboxylic acid methyl ester.

EXAMPLE III 4,6-Dimethoxy-2-Phenyl-5-Pyrimidinecarboxylic Acid Methyl Ester

To a methanol solution (25 ml.) containing sodium methoxide prepared from 0.05 g. of metallic sodium is added 1.1 g. of the oxidation product of Example II. The resulting mixture is heated gently for 1 hour. Chilling of the reaction mixture causes separation of a precipitate which is collected and washed with water several times to give 0.9 g. of the title compound, m.p. 105°–107°C. Recrystallization from methanol provides an analytical sample, m.p. 105°–107°C.

Analysis for $C_{14}H_{14}N_2O_2$:
Calculated: C, 61.31; H, 5.15; N, 10.21.
Found: C, 60.97; H, 5.29; N, 10.21.

EXAMPLE IV

4-Methoxy-2-Phenyl-6-(2,3-xylidino)-5-Pyrimidine-Carboxylic Acid Methyl Ester

To a solution containing 1.2 g. of the oxidation product of Example II in 20 ml. of dimethylformamide is added 5 g. of 2,3-dimethylaniline. The resulting mixture is heated under reflux for 2 hours and then poured into a large amount of ice water, whereby an oily product is formed. After decanting the aqueous layer, the oil is extracted with ether. The ether layer is washed with 1N hydrochloric acid, water, and dried over magnesium sulfate. Evaporation of ether under reduced pressure gives an oil which solidifies on standing. Recrystallization from methanol provides an analytical sample, m.p. 138°–140°C.

Analysis for $C_{21}H_{21}N_3O_3$: Calculated: C, 69.40; H, 5.83; N, 11.56. Found: C, 69.24; H, 5.76; N, 11.62.

EXAMPLE V

4-Methoxy-2-Phenyl-6-($\alpha$, $\alpha$, $\alpha$-Trifluoro-m-Toluidino)-5-Pyrimidinecarboxylic Acid Methyl Ester 4-Chloro-6-methoxy-2-phenyl-5-pyrimidinecarboxylic acid, methyl ester, (7.6 g.) and $\alpha,\alpha,\alpha$-trifluoro-m-toluidine (5.2 g.) are reacted according to the procedure of Example IV to give the title compound (1.15 g.), m.p. 113°–117°C. After recrystallization from methanol the melting point is 115°–117°C.

Analysis for $C_{20}H_{16}F_3N_3O_3$: Calculated: C, 59.55; H, 4.00; N, 10.42. Found: C, 59.88; H, 4.17; N, 10.38.

EXAMPLE VI 4,6-Dimethoxy-2-Phenyl-5-Pyrimidinecarboxylic Acid

A mixture of 4,6-dimethoxy-2-phenyl-5-pyrimidinecarboxylic acid methyl ester (1.6 g.), 75% aqueous dimethylsulfoxide (70 ml.), and 15% aqueous sodium hydroxide solution (5 ml.) is heated on a steam bath for 4 hours. After cooling to room temperature, the reaction mixture is acidified with 3 N hydrochloric acid to pH ~3. About 100 ml. of hot water is added to the solution. Cooling the solution in an ice bath gives a precipitate which is collected and washed with water to give the title compound in quantitative yield, m.p. 173°–175°C.

Analysis for $C_{13}H_{12}N_2O_4$: Calculated: C, 59.99; H, 4.65; N, 10.77. Found: C, 59.77; H, 4.49; N, 10.87.

EXAMPLE VII

4-Methoxy-2-Phenyl-6-(2,3-xylidino)-5-Pyrimidine-Carboxylic Acid

A mixture of 4-methoxy-2-phenyl-6-(2,3-xylidino)-5-pyrimidinecarboxylic acid methyl ester (0.7 g.), 75% aqueous dimethylsulfoxide (50 ml.), and 15% aqueous sodium hydroxide solution (2 ml.) is heated on a steam bath for 6.5 hours, and then filtered. Acidification of the filtrate with 3 N hydrochloric acid and subsequent chilling causes separation of a precipitate which is collected and washed with water several times to afford the title compound (0.65 g.), m.p. 175°–177°C.

Analysis for $C_{20}H_{19}N_3O_3$: Calculated: C, 68.75; H, 5.48; N, 12.03. Found: C, 68.96; H, 5.69; N, 12.00.

EXAMPLE VIII

4-Methoxy-2-Phenyl-6-($\alpha$, $\alpha$, $\alpha$-Trifluoro-m-Toluidino)-5-Pyrimidinecarboxylic Acid A mixture of 4-methoxy-2-phenyl-6-($\alpha$, $\alpha$, $\alpha$-trifluoro-m-toluidino)-5-pyrimidinecarboxylic acid methyl ester (1.0 g.), 50% aqueous dimethylsulfoxide (50 ml.), 15% aqueous sodium hydroxide (3 ml.), and dimethylsulfoxide (20 ml.) is heated on a steam bath for 6.5 hours. Acidification of the resulting solution with 3 N hydrochloric acid causes separation of a precipitate which is collected and washed with water to give 0.25 g. of the title compound, m.p. 192°–194°C. The crude compound is dissolved in dilute aqueous sodium hydroxide solution. Filtration and subsequent acidification of the filtrate with dilute hydrochloric acid yields the title compound, m.p. 192°–194°C.

Analysis for $C_{19}H_{14}F_3N_3O_3$: Calculated: C, 58.61; H, 3.62; N, 10.80. Found: C, 58.54; H, 3.67; N, 10.67.

EXAMPLE IX

4-Methylamino-6-Methoxy-2-Phenyl-5-Pyrimidinecarboxylic Acid Methyl Ester

Methylamine is introduced over a 15 minute period into a methanolic solution (100 ml.) of crude 4-chloro-6-methoxy-2-phenyl-5-pyrimidinecarboxylic acid methyl ester (~10 g.). The resulting solution is charged in a steel bomb, and heated in a steam bath for 0.5 hour. Excess amine and methanol are removed under reduced pressure to give a solid residue. Repeated recrystallization from methanol affords 1.1 g. of the title compound, m.p. 113°–114°C.

Analysis for $C_{14}H_{15}N_3O_3$: Calculated: C, 61.53; H, 5.53; N, 15.38. Found: C, 61.50; H, 5.60; N, 15.43.

EXAMPLE X

4-Methylamino-6-Methoxy-2-Phenyl-5-pyrimidinecarboxylic Acid

A mixture of 4-methylamino-6-methoxy-2-phenyl-5-pyrimidinecarboxylic acid methyl ester (1.0 g.), 75% aqueous dimethylsulfoxide (45 ml.), and 15% aqueous sodium hydroxide (3 ml.) is heated on a steam bath for 6 hours. Acidification of the resulting solution with 3 N hydrochloric acid to pH 3 causes separation of a precipitate which is collected and washed with water to give 0.95 g. of the title compound, m.p. 203°–205°C.

Analysis for $C_{13}H_{13}N_3O_3$: Calculated: C, 60.22; H, 5.05; N, 16.21. Found: C, 59.89; H, 4.95; N, 16.00.

EXAMPLE XI

A compound of Formula I is administered orally (P.O.) or intraperitoneally (I.P.) to each of three mice. The animals are observed for signs of CNS-depressant activity such as decreased motor activity, decreased respiration, sedation, and ataxia.

When tested according to the aforedescribed procedure, the following compounds provided signs of CNS-depressant activity at the doses indicated below:

1. 4,6-dimethoxy-2-phenyl-5-pyrimidinecarboxylic acid, methyl ester: decreased motor activity, decreased respiration, ataxia; and sedation-ataxia at 400 mg./kg. (P.O.).

2. 4,6-dimethoxy-2-phenyl-5-pyrimidinecarboxylic acid: decreased motor activity and decreased respiration at 127 mg./kg. (P.O.); sedation-ataxia and ataxia 400 mg./kg. (P.O.).

3. 4-methoxy-2-phenyl-6-(2,3-xylidino)-5-pyrimidinecarboxylic acid: decreased motor activity, decreased respiration, sedation-ataxia; ataxia, and loss of righting reflex at 127 mg./kg. (P.O.).

4. 4-methoxy-2-phenyl-6-(α, α, α-trifluoro-m-toluidino)-5-pyrimidinecarboxylic acid: decreased motor activity, decreased respiration, and sedation-ataxia at 127 mg./kg. (P.O.).

5. 4-methylamino-6-methoxy-6-phenyl-5-pyrimidinecarboxylic acid, methyl ester: decreased motor activity and decreased respiration at 40 mg./kg. (I.P.); sedation-ataxia and ataxia at 127 mg./kg. (I.P.).

6. 4-methylamino-6-methoxy-2-phenyl-5-pyrimidinecarboxylic acid: decreased motor activity, decreased respiration, and sedation-ataxia at 400 mg./kg. (P.O.).

We claim:

1. A compound of the formula

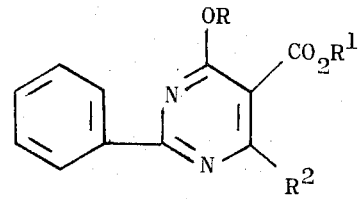

wherein R is lower alkyl; $R^1$ is hydrogen or lower alkyl; and $R^2$ is methylamino, α, α, α-trifluoro-m-toluidino, or 2,3-xylidino.

2. A compound as defined in claim 1 which is 4-methylamino-6-methoxy-2-phenyl-5-pyrimidinecarboxylic acid.

3. A compound as defined in claim 1 which is 4-methylamino-6-methoxy-2-phenyl-5-pyrimidinecarboxylic acid, methyl ester.

4. The compound as defined in claim 1 which is 4-methoxy-2-phenyl-6-(2,3-xylidino)-5-pyrimidinecarboxylic acid.

5. The compound as defined in claim 1 which is 4-methoxy-2-phenyl-6-(2,3-xylidino)-5-pyrimidinecarboxylic acid, methyl ester.

6. The compound as defined in claim 1 which is 4-methoxy-2-phenyl-6-(α, α, α-trifluoro-m-toluidino)-5-pyrimidinecarboxylic acid.

7. The compound as defined in claim 1 which is 4-methoxy-2-phenyl-6-(α, α, α-trifluoro-m-toluidino)-5-pyrimidinecarboxylic acid, methyl ester.

* * * * *